(12) United States Patent
Mandery et al.

(10) Patent No.: US 12,459,516 B2
(45) Date of Patent: Nov. 4, 2025

(54) DUAL MOTOR GEARBOX SPOOL LOCK

(71) Applicant: Dana Automotive Systems Group, LLC, Maumee, OH (US)

(72) Inventors: Nathan D. Mandery, Perrysburg, OH (US); Kyle Mourdock, Bowling Green, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 287 days.

(21) Appl. No.: 18/185,165

(22) Filed: Mar. 16, 2023

(65) Prior Publication Data

US 2023/0294703 A1    Sep. 21, 2023

Related U.S. Application Data

(60) Provisional application No. 63/269,697, filed on Mar. 21, 2022.

(51) Int. Cl.
*B60W 10/00* (2006.01)
*B60K 1/02* (2006.01)
*B60W 10/02* (2006.01)
*B60W 10/08* (2006.01)
*B60W 30/18* (2012.01)

(52) U.S. Cl.
CPC ......... *B60W 30/18172* (2013.01); *B60K 1/02* (2013.01); *B60W 10/02* (2013.01); *B60W 10/08* (2013.01); *B60W 2510/0225* (2013.01); *B60W 2520/26* (2013.01); *B60W 2710/021* (2013.01); *B60W 2710/083* (2013.01)

(58) Field of Classification Search
CPC .......... B60W 30/18172; B60W 10/02; B60W 10/08; B60W 2510/0225; B60W 2520/26; B60W 2710/021; B60W 2710/083; B60W 10/00; B60K 1/02; B60K 17/02
USPC ......................................................... 701/22
See application file for complete search history.

(56) References Cited

U.S. PATENT DOCUMENTS

| | | | |
|---|---|---|---|
| 11,180,013 B1* | 11/2021 | Yu .......................... | B60K 17/16 |
| 2013/0345013 A1* | 12/2013 | Antal ..................... | B62M 11/16 |
| | | | 475/269 |
| 2015/0039170 A1* | 2/2015 | Isomura ................. | B60K 6/547 |
| | | | 701/22 |
| 2018/0087653 A1* | 3/2018 | Kurosaki ............... | B60K 6/383 |
| 2019/0190348 A1* | 6/2019 | Verbridge .......... | B60K 23/0808 |
| 2020/0238973 A1* | 7/2020 | Piracha ................ | B60W 10/08 |
| 2021/0388890 A1* | 12/2021 | Desai .................... | B60K 23/04 |

\* cited by examiner

*Primary Examiner* — Shardul D Patel
(74) *Attorney, Agent, or Firm* — McCoy Russell LLP (57) ABSTRACT

Methods and systems are provided for a vehicle including a first motor coupled to a first gear train, a second motor coupled to a second gear train, and a spool lock configured to variably couple the first gear train and the second gear train, allowing a first torque output by the first motor and a second torque output by the second motor to be combined and output to a first wheel coupled to the first gear train or a second wheel coupled to the second gear train.

20 Claims, 8 Drawing Sheets

DUAL MOTOR GEARBOX SPOOL LOCK

CROSS REFERENCE TO RELATED APPLICATIONS

The present application claims priority to U.S. Provisional Application No. 63/269,697, entitled DUAL MOTOR GEARBOX SPOOL LOCK, and filed on Mar. 21, 2022. The entire contents of the above-listed application are hereby incorporated by reference for all purposes.

TECHNICAL FIELD

The present description relates generally to methods and systems for an electric drivetrain.

BACKGROUND AND SUMMARY

Electric drivetrains (e.g., e-drives) may be implemented in all-electric vehicles (EVs) to enable torque generated at one or more electric motors to be translated to vehicle motion. For EVs, the e-drive may include a transmission which may utilize, as an example, gears and gear trains to convert speed and torque from at least one rotating power source, e.g., one or more electric motors, to drive rotation of the vehicle's wheels.

A gearbox of an EV which uses dual electric motors may have dual, separately operating, gear trains. For a front wheel drive or rear wheel drive vehicle, each of the dual electric motors may provide torque to one wheel. For example, a first motor and a first gear train may provide torque to a first wheel (e.g., a left wheel), and a second motor and a second gear train may provide torque to a second wheel (e.g., a right wheel). This may allow for torque vectoring during nominal driving conditions, however a maximum torque of the first wheel and/or the second wheel may be determined based on a maximum output of a respective motor (e.g., the first motor and the second motor, respectively). Under some off-road driving conditions, such as when one of the first wheel and the second wheel are in the air (e.g., not in contact with a driving surface or is slipping), it may be beneficial to provide additional torque to the other wheel (e.g., the first wheel or the second wheel which is in contact with the driving surface). Under some high performance conditions, it may be beneficial to lock both output shafts together to aid in traction or to eliminate wheel slip.

In one example, the issues described above may be addressed by a system for an electric vehicle (EV) gearbox, comprising a first motor coupled to a first gear train, a second motor coupled to a second gear train, and a spool lock configured to lock and/or unlock the first gear train and the second gear train together, allowing a first torque output by the first motor and a second torque output by the second motor to be combined and output to a first wheel coupled to the first gear train or a second wheel coupled to the second gear train. In this way, an EV (e.g., including the EV gearbox described above) may have increased mobility and traction during severe off-road conditions, such as when one of the first wheel and the second wheel are not in contact with the driving surface (e.g., are in the air) or high performance condition where increased traction is desired. Traction may be enhanced for the wheel (e.g., the first wheel or the second wheel) which is in contact with the driving surface due to an increase in torque provided to the wheel.

As one example, a sensor and control system of the EV may determine that at least one of the first wheel and the second wheel are not in contact with the driving surface or is slipping. Torque of the motor coupled to the wheel which is not in contact with the driving surface or is slipping (e.g., the first motor for the first wheel) may be decreased. The spool lock may be engaged to couple the first gear train to the second gear train, and torque of the first motor may be increased to equal torque of the second motor. Torque from both the first motor and the second motor are thus combined and output to the second wheel, which may be in contact with the driving surface. This may increase mobility and traction of the second wheel with the driving surface.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
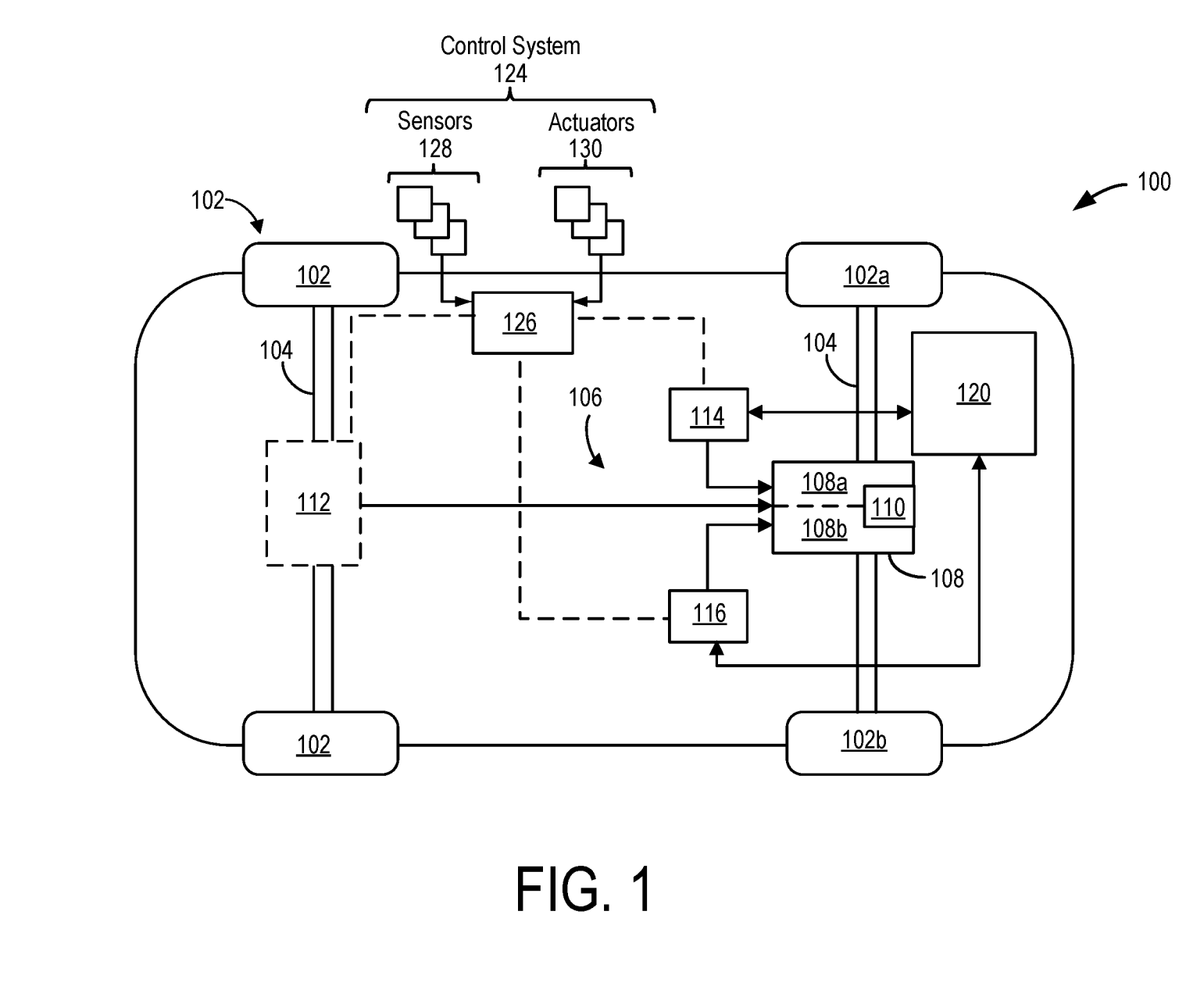
FIG. 1 shows a schematic diagram of an electrical drive train (e-drive) of a vehicle.
Figure 5:
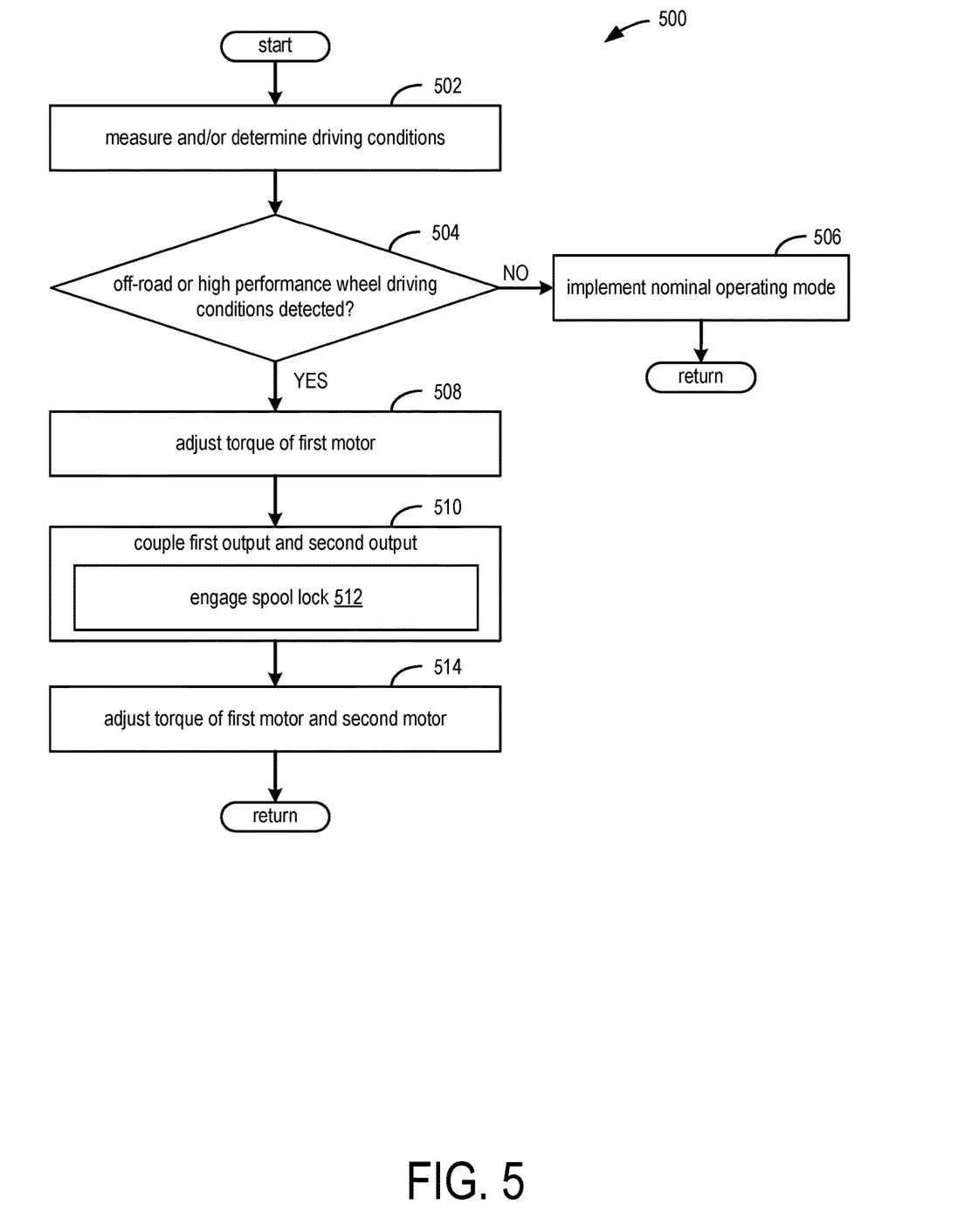
FIG. 5 shows a first method for engaging the spool lock of FIGS. 2-4B.
Figure 6:
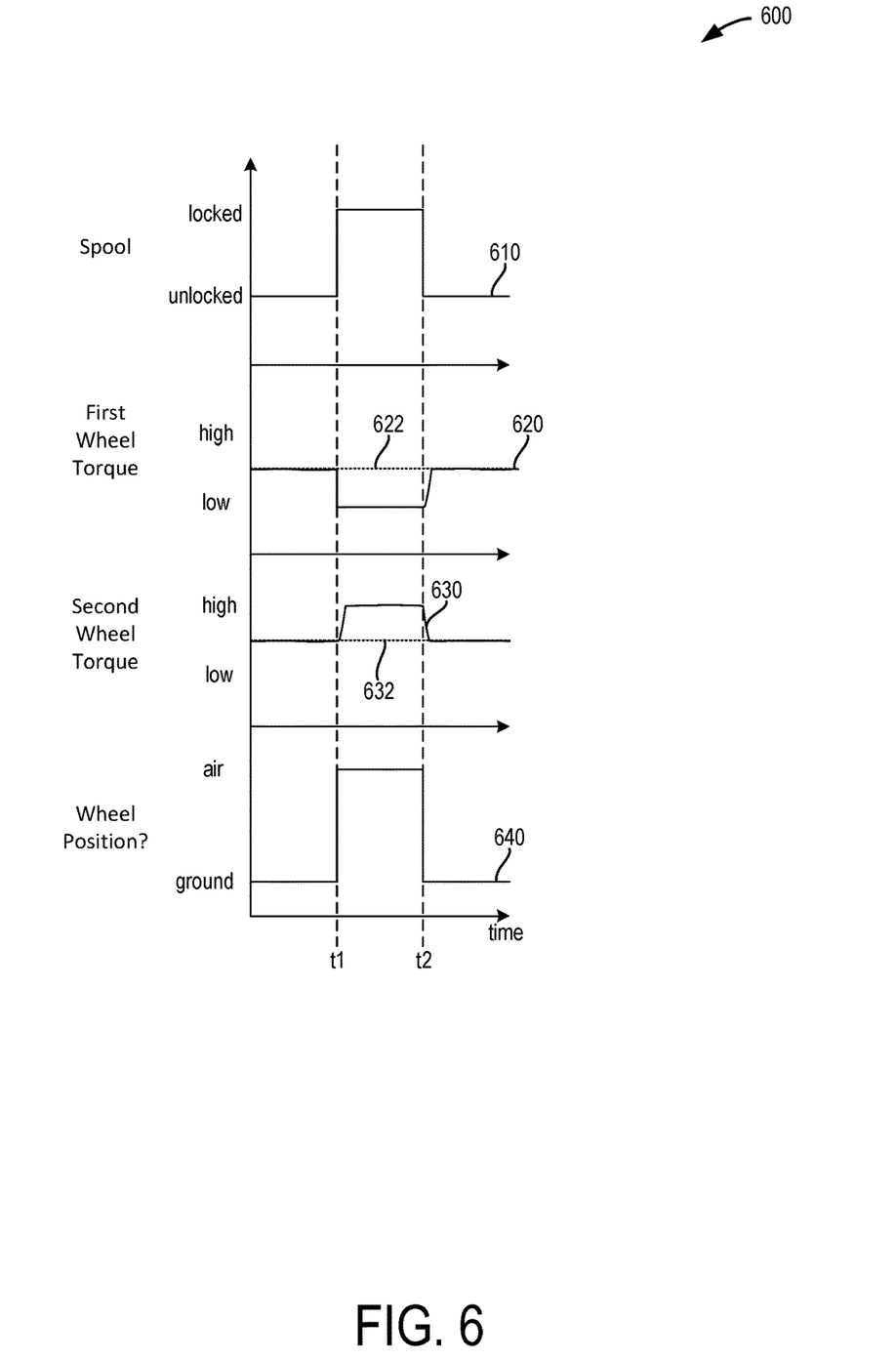
FIG. 6 shows an operating sequence illustrating changes to the gear trains in response to wheel conditions.

The following description relates to systems and methods for a spool lock of an electric vehicle dual motor gearbox, which may couple a first motor and a second motor, and output summed torque of the first motor and the second motor to a wheel in contact with a driving surface. The spool lock may be implemented in a transmission of an electric vehicle, as shown in FIG. 1. The transmission of FIG. 1 is shown in further detail in FIG. 2, including a first output shaft coupled to a first motor and a second output shaft coupled to a second motor. FIG. 3A shows a partial cross-section of a second gear on the second output shaft with a first embodiment of the spool lock positioned therein. FIG. 3B shows the partial cross-section with a second embodiment of the spool lock. The spool lock, in either the first embodiment or the second embodiment, is shown in an unlocked configuration in FIG. 4A, where the first output shaft and the second output shaft, and thus their respective torque outputs, are uncoupled. FIG. 4B shows the spool lock in a locked configuration, where the first output shaft and the second output shaft, and thus their respective torque outputs, are coupled. FIG. 5 shows a method for detecting an operating mode of the vehicle, including determining if a wheel is not in contact with the driving surface or is slipping, and subsequently locking the spool lock. FIG. 6 shows an operating sequence illustrating changes to the gear trains in response to wheel conditions.

It is also to be understood that the specific assemblies and systems illustrated in the attached drawings, and described in the following specification are simply exemplary embodiments of the inventive concepts defined herein. For purposes of discussion, the drawings are described collectively. Thus, although they may not be, like elements may be commonly referred to herein with like reference numerals and may not be re-introduced. FIGS. 2-4B are shown approximately to scale. FIG. 2-4B may be used to represent other relative dimensions. As used herein, the term "substantially" is construed to mean plus or minus five percent of the range unless otherwise specified.

Further, FIGS. 2-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning now to FIG. 1, for an EV, torque may be provided to a vehicle's wheels from more than one source, including one or more electric motors and an engine. A schematic representation of a vehicle 100 is depicted in FIG. 1 which include sets of wheels 102 coupled by axles 104 (e.g., pairs of wheels are coupled to one another by the axles 104). It will be appreciated that vehicle 100 is shown in FIG. 1 for illustrative purposes and is a non-limiting example of how an EV may be configured. Other examples include various arrangements and positioning of components of the vehicle described below as well as additional components not shown in FIG. 1 for brevity.

A drive train 106 of vehicle 100 may include a transmission 108 (e.g., a gear box, gear train, etc.) coupled to one or more of the axles 104 of vehicle 100. The transmission 108 may be coupled to a rear axle of the axles 104, as shown in FIG. 1, to a front axle or to both axles, in other examples. The transmission 108 may include a final drive 110 of the drive train 106 which, for example, may be a differential or any other suitable gearing. The transmission 108 and final drive 110 may together translate speed and torque from at least one rotating source to the vehicle wheels 102 to propel vehicle 100.

When configured as an HEV, the rotating source may be an engine 112, e.g., an internal combustion engine, a first electric machine 114, and/or a second electric machine 116. When vehicle 100 is an EV, engine 112 may be omitted. In some examples, and as described herein, the first electric machine 114 and the second electric machine 116 may be motor/generators, with a capacity to convert electrical energy into mechanical energy and vice versa. As such, the electric machines may hereafter also be referred to as motors and/or generators. The first electric machine 114 and the second electric machine 116 may be electrically coupled to a traction battery 120 of vehicle 100 to both draw power from the traction battery 120 and provide electrical energy to be stored at the traction battery 120. The electric machines may be similarly configured, e.g., having similar operational speed and torque ranges, and thereby referred to as symmetric, or may have different speed and torque outputs, thereby referred to as asymmetric.

In some examples, and as described herein, vehicle 100, when configured as an EV having the first electric machine 114 and the second electric machine 116 may further include an independent gear train for each of the first electric machine 114 and the second electric machine 116. For example, the transmission 108 may include a first gear train 108a and a second gear train 108b. The first gear train 108a may couple the first electric machine 114 to a first wheel 102a of the wheels 102, and a second gear train 108b may couple the second electric machine 116 to a second wheel 102b of the wheels 102. The first gear train 108a and the second gear train 108b may thus operate independently to provide torque from a respective motor to a respective wheel. For example, the first electric machine 114 may provide a first torque to the first wheel 102a and the second electric machine 116 may provide a second torque to the second wheel 102b. Separate operation of the first gear train 108a and the second gear train 108b may allow for torque vectoring of each of the first electric machine 114 and the second electric machine 116, and thus of the first wheel 102a and the second wheel 102b, during a first driving mode (e.g., a nominal driving mode). During the nominal driving mode, such as when the first wheel 102a and the second wheel 102b are in contact with a driving surface (e.g., a road, off-road terrain, etc.) and/or are not slipping, torque output of each wheel may be based on torque output of the respective motor and gear train. The torque provided to the wheels may be independent of one another. In other words, torque of the second wheel 102b may be based on the second torque output of the second electric machine 116 and independent of the first torque output by the first electric machine 114. Each of the first torque and the second torque may be independently variable, for example, the first torque and the second torque may be equal or unequal based on vehicle operating conditions, as further described herein.

Under some operating conditions, such as conditions outside of the first driving mode, it may be desirable for a wheel to have a torque output greater than a threshold torque output of a corresponding electric machine. For example, if the vehicle 100 is in a second driving mode, then the vehicle 100 may be off-road driving, driving in slippery conditions (e.g., driving on ice, water, gravel, sand, mud, or another loose surface), and/or high performance driving (e.g., racing), then it may be desired to maintain torque of each of the wheels during the second driving mode. However, the road conditions during the second driving mode may result in traction of one of the wheels being reduced, resulting in a torque output of the wheel onto the ground being less than an output of the corresponding motor. To ameliorate this condition, it may be desired to combine the torque output of the motors and provide the torque to the wheel with more traction, thereby maintaining a desired level of torque output for the vehicle, despite one of the wheels being in the air or slipping. Thus, it may be desirable for the first wheel 102a and/or the second wheel 102b, which is in contact with the driving surface, to have an increased amount of torque relative to the threshold torque output of the corresponding electric machine. Providing an amount of torque greater than what may be provided independently by the coupled motor to the wheel which is in contact with the driving surface may increase mobility and traction of the wheel and may allow the vehicle to maneuver to a position in which the wheels 102 are in contact with the driving surface and/or continue meeting a driver demand despite a wheel being in the air or slipping.

The final drive 110 may include a spool lock configured to selectively couple (e.g., lock and/or unlock) the first gear train 108a and the second gear train 108b, allowing the first torque output by the first electric machine 114 and the second torque output by the second electric machine 116 to be combined and output to the first wheel 102a when the second wheel 102b is not in contact with the driving surface or is slipping, or output to the second wheel 102b when the first wheel 102a is not in contact with the driving surface or is slipping. Said another way, torque of the electric machines may be combined when the spool lock is locked and may be separate when the spool lock is unlocked. Further details of the spool lock are herein described in reference to FIGS. 2-4B.

Coupling of the first gear train 108a and the second gear train 108b, and thus torque output to each of the first wheel 102a and the second wheel 102b, may be based on driving conditions as determined by a vehicle control system 124 and/or selected by a vehicle operator. Adjustment of the drive train between the various modes (e.g., the nominal driving mode and the off-road or high performance driving mode) as well as control of operations within each mode may be executed based on the vehicle control system 124, including a controller 126, as shown in FIG. 1. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first electric machine 114 and the second electric machine 116 to measure motor speed and motor temperature, a Hall effect sensor at the engine 112 to measure a crankshaft speed, a pedal position sensor to detect a depression of an operator-actuated pedal, such as an accelerator pedal or a brake pedal, speed sensors at the vehicle wheels 102, etc. Upon receiving the signals from the various sensors 128 of FIG. 1, controller 126 processes the received signals, and employs various actuators 130 of vehicle 100 to adjust engine and drive train operations based on the received signals and instructions stored on the memory of controller 126. For example, controller 126 may receive an indication of depression of the brake pedal, signaling a desire for decreased vehicle speed. In response, the controller 126 may command operation of at least one of the electric machines as a generator to recharge the traction battery 120.

Figure 2:
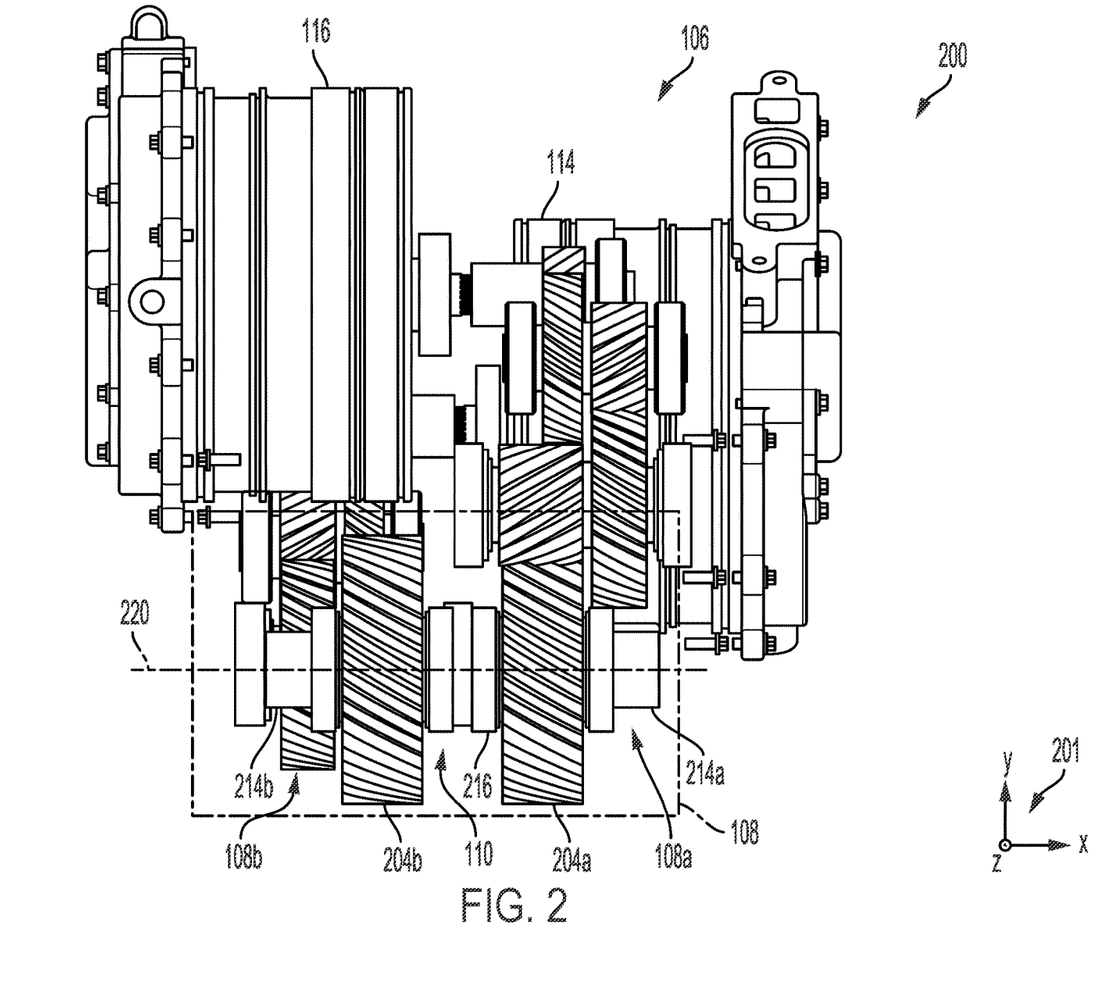
FIG. 2 shows a front view of a transmission of the e-drive of FIG. 1.
Figure 3A:
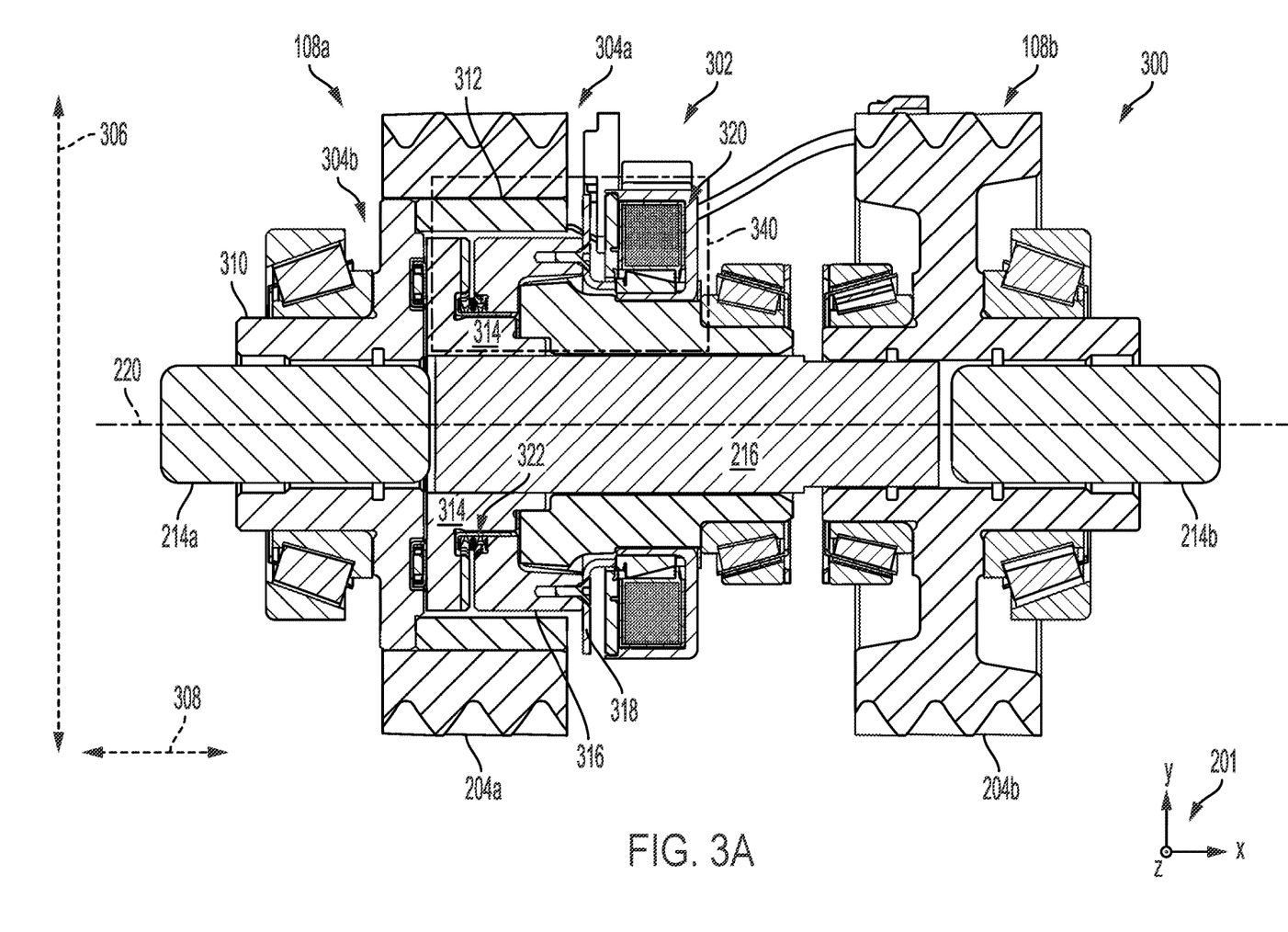
FIG. 3A shows a partial cross-section of a portion of the transmission of FIG. 2, including a first embodiment of a spool lock.
Figure 3B:
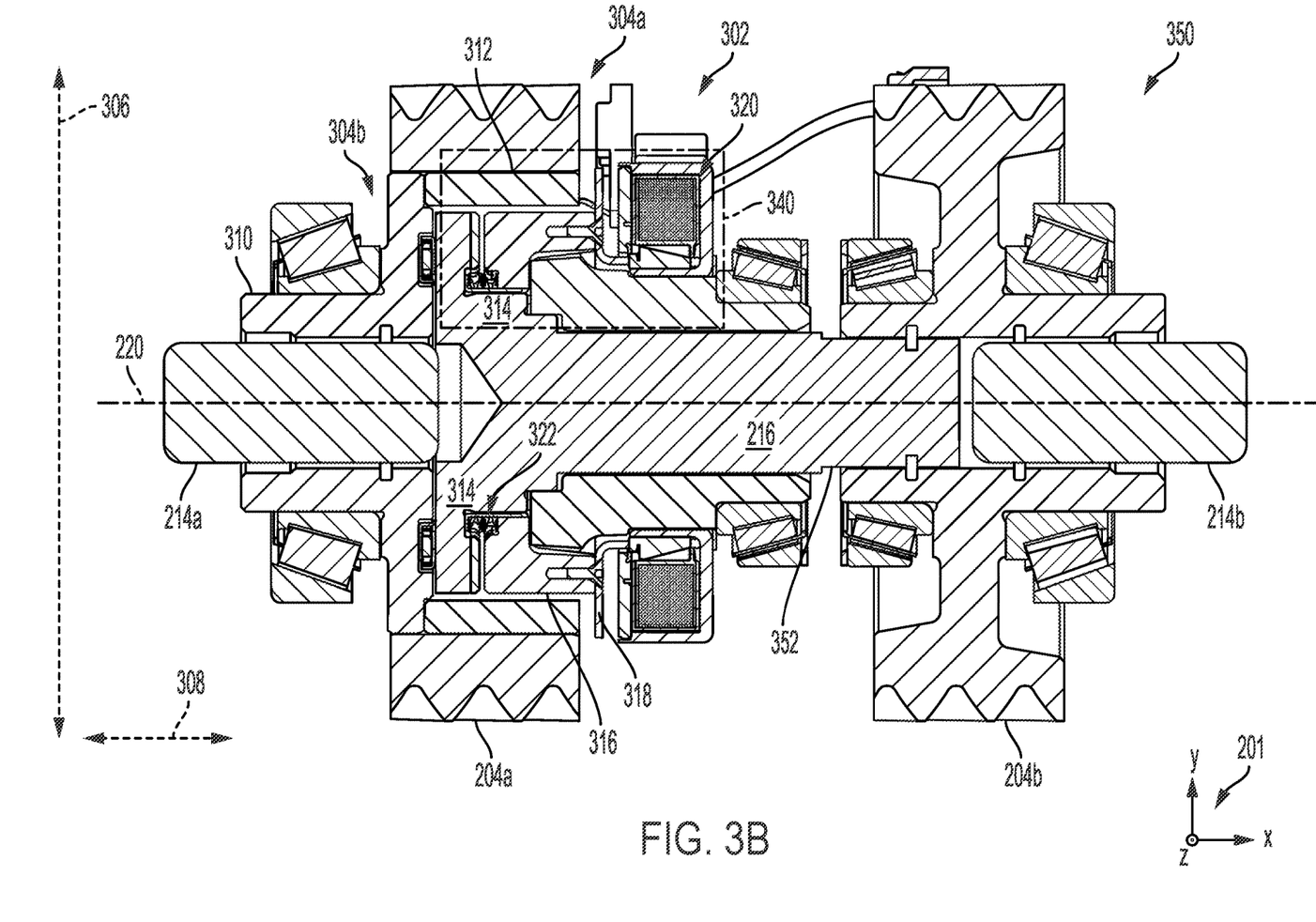
FIG. 3B shows the partial cross-section of a portion of the transmission of FIG. 2, including a second embodiment of a spool lock.

The drive train 106 is shown in a front view 200 in FIG. 2, including the first electric machine 114, the second electric machine 116, the first gear train 108a, the second gear train 108b, and the final drive 110, including the spool lock (not shown). A set of reference axes 201 are provided for comparison between views shown in FIG. 2-4B. The reference axes 201 indicate a y-axis, an x-axis, and a z-axis. In one example, the y-axis may be parallel with a direction of gravity and the x-z plane may be parallel with a horizontal plane the vehicle wheels 102 may rest upon. A plane parallel to the y-x plane may be used to create the cross-sections visible in FIG. 3A-4B, (e.g., 300, 400, 450). As such, a cross-sections of FIG. 3A, FIG. 3B, FIG. 4A, and FIG. 4B are taken along the y-x plane.

A first gear 204a may be a final gear of the first gear train 108a and a second gear 204b may be a final gear of the second gear train 108b. Thus, the first gear 204a and the second gear 204b may be included in the final drive 110 and configured as output gears. The final drive 110 further includes a first output shaft 214a coupled to the first gear 204a, a second output shaft 214b coupled to the second gear 204b, and a splined intermediate shaft 216. The first output shaft 214a may provide torque output from the first electric motor 114 (e.g., the first torque) to the first wheel 102a. The second output shaft 214b may provide torque output from the second electric motor 116 (e.g., the second torque) to the second wheel 102b. The splined intermediate shaft 216 may extend between the first gear 204a and the second gear 204b along the same rotational axis 220 as the first output shaft 214a and the second output shaft 214b. Thus, the first wheel 102a, the second wheel 102b, the first output shaft 214a, the second output shaft 214b, and the splined intermediate shaft 216 are arranged along a single axis (e.g., rotational axis 220).

When the spool lock, as further shown in FIGS. 3A-4B, is engaged, the first output shaft 214a and the second output shaft 214b may be coupled to (e.g., interlocked with) the splined intermediate shaft 216 and other components of the spool lock. When coupled, the first torque and the second torque may be combined and a sum of the first torque and the second torque may be provided to one of the first wheel 102a and the second wheel 102b. When the spool lock is disengaged, the first output shaft 214a and the second output shaft 214b may be uncoupled from the splined intermediate shaft 216 (e.g., no longer interlocked via the splined intermediate shaft 216). When uncoupled, the first torque may be output to only the first wheel 102a and the second torque may be output to only the second wheel 102b. Coupling and uncoupling of the first output shaft 214a and the second output shaft 214b by engaging and disengaging the spool lock, respectively, is further described in FIGS. 3A-5.

Turning now to FIGS. 3A-3B, a partial cross-section of a portion of the transmission 108 is shown, including a first embodiment 300 of a spool lock 302 in FIG. 3A and a second embodiment 350 of the spool lock 302 in FIG. 3B. Elements of the transmission 108 of FIG. 2 which are shown in FIGS. 3A-3B are similarly numbered in these and subsequent figures. As shown in FIG. 3A, the spool lock 302 is integrated in an interior of the first gear 204a. For example, the first gear 204a may include a first cutout 304a and second cutout 304b, each having a first height 306 and a first depth 308. The first gear 204a may thus rotate about the rotational axis 220 while the spool lock 302 is positioned on the second output shaft 214b and the splined intermediate shaft 216. In another embodiment, the spool lock 302 may be similarly positioned in an interior of the second gear 204b. The spool lock 302 includes a housing with a spool flange half 310 and a spool cap half 312. The housing may rotate with or independent of rotation of the first gear 204a, as further described below.

The interior of the spool lock 302 may be configured with a rotating lock ring 314, a cam ring 316, a pressure plate 318, an electromagnetic actuator 320, and a return spring 322. The cam ring 316 and the pressure plate 318 may rotate about and move axially along the rotational axis 220. As shown in the first embodiment 300 of FIG. 3A, the rotating lock ring 314 circumferentially surrounds the splined intermediate shaft 216. The rotating lock ring 314 may be coupled to the splined intermediate shaft 216, such that the rotating lock ring 314 rotates with rotation of the splined intermediate shaft 216 about the rotational axis 220. In the second embodiment 350 of the spool lock 302, as shown in FIG. 3B, the splined intermediate shaft 216 and the rotating lock ring 314 may be integrated as a single piece which may rotate about the rotational axis 220. Other elements of the spool lock 302 in the second embodiment 350 may be equivalent to those of the first embodiment 300. The rotating lock ring 314 and the cam ring 316 may be configured as a dog clutch, where each of the rotating lock ring 314 and the cam ring 316 are configured with teeth on a first face, allowing for meshing and/or interlocking of the rotating lock ring 314 and the cam ring 316. The electromagnetic actuator 320 may be stationary and may house a solenoid with a piston, which moves axially along the rotational axis 220 and is shown in further detail in FIGS. 4A-4B. The return spring 322 may also move axially along the rotational axis 220. Each of the rotating lock ring 314, the cam ring 316, the pressure plate 318, and a return spring 322 may circumferentially surround the rotational axis 220. The electromagnetic actuator 320 may include two pistons, where each piston is positioned on either side of the rotational axis 220. Alternatively, the electromagnetic actuator 320 may have one piston which extends circumferentially about the rotational axis 220. Further, the electromagnetic actuator 320 may have any configuration suitable for pushing the pressure plate 318 along the rotational axis 220 to engage the spool lock 302.

Figure 4A:
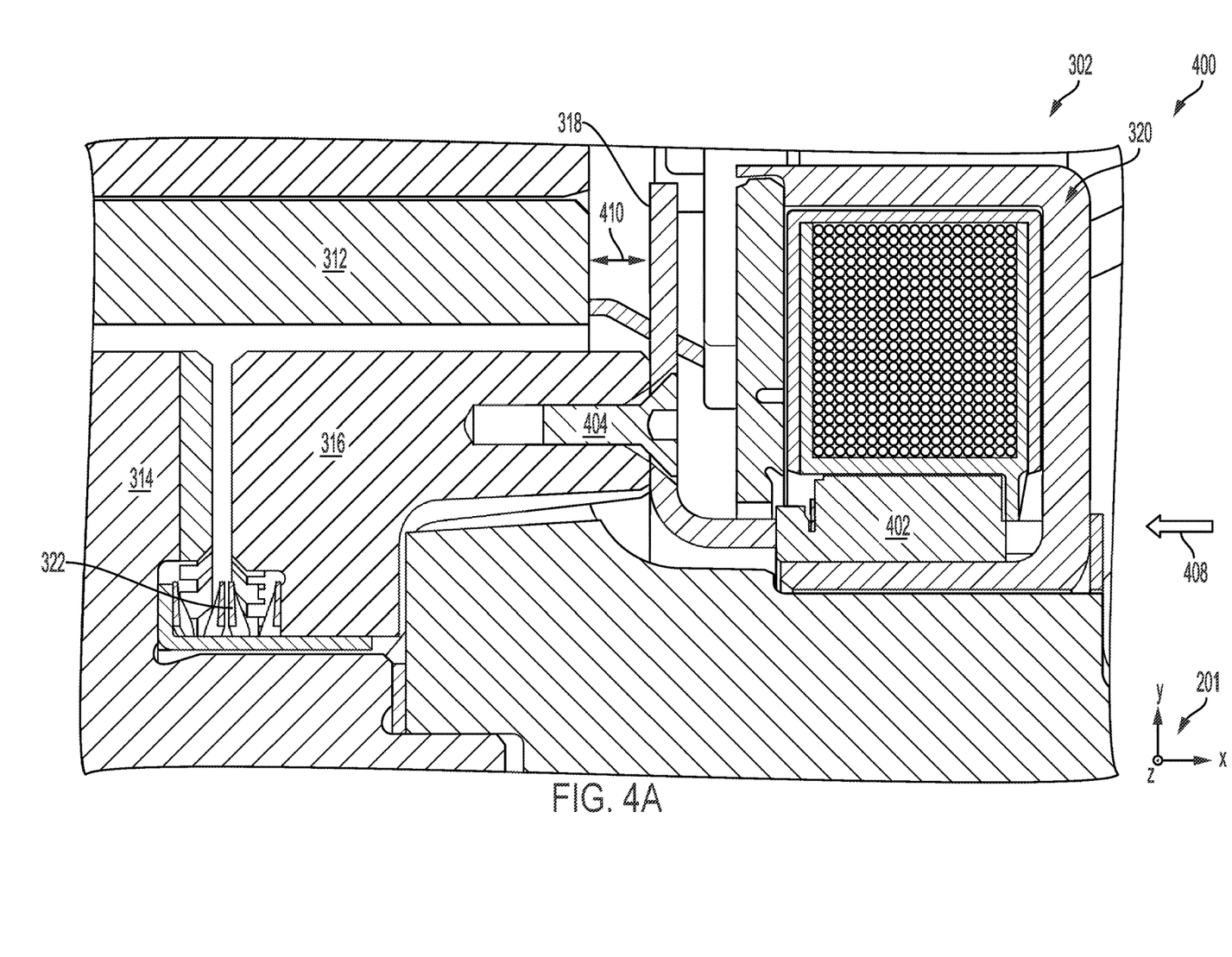
FIG. 4A shows a cut-away side view of a portion of the spool lock of FIG. 2 when the spool lock is disengaged.
Figure 4B:
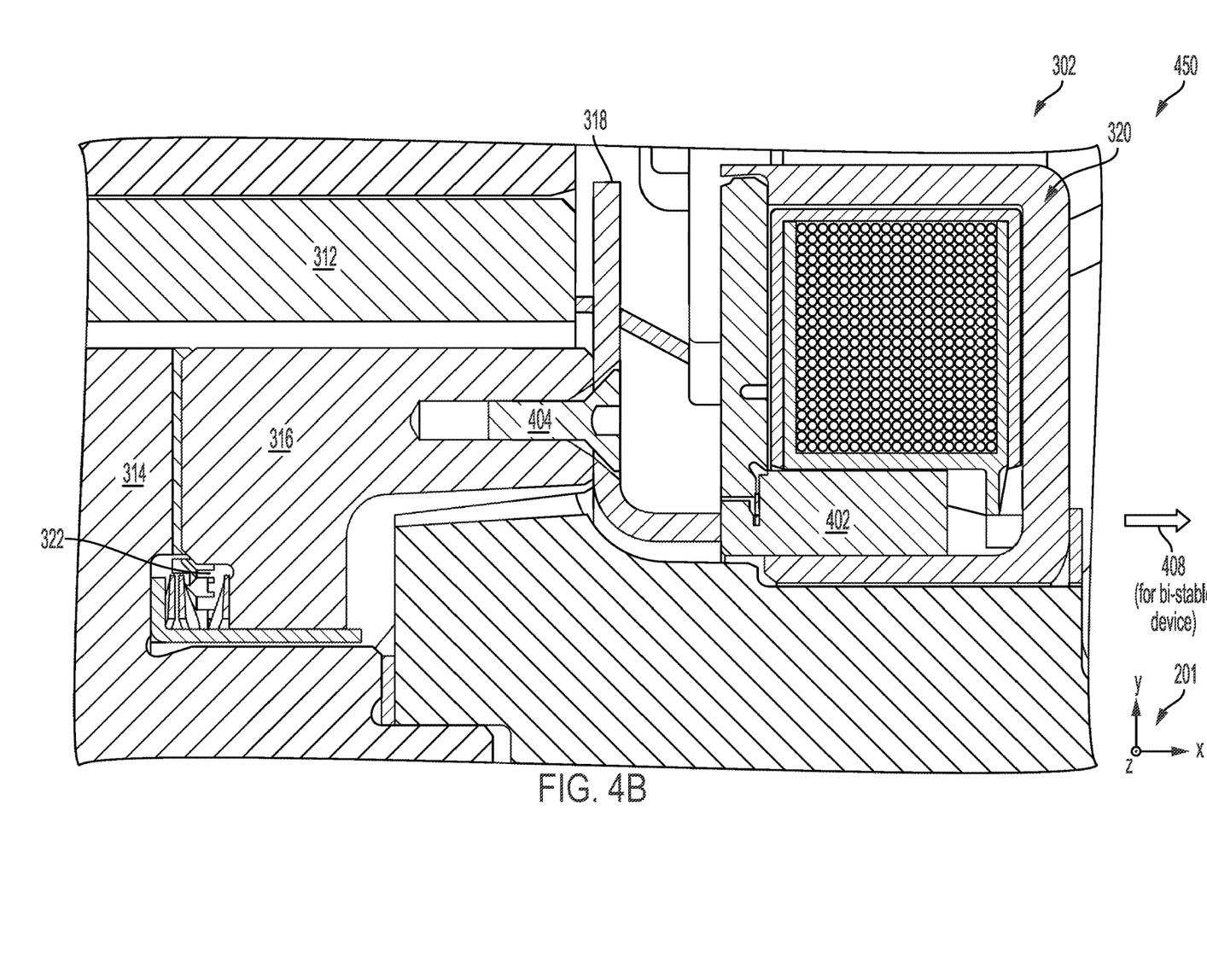
FIG. 4B shows the cut-away side view of a portion of the spool lock of FIG. 2 when the spool lock is engaged.

Turning to FIGS. 4A-4B, a first view 400 of FIG. 4A shows a portion 340 of the spool lock 302 of FIGS. 3A-3B when the spool lock 302 is disengaged. A second view 450 of FIG. 4B shows the portion 340 of the spool lock 302 of FIGS. 3A-3B when the spool lock 302 is engaged. FIGS. 4A-4B show further details of the electromagnetic actuator 320, including a piston 402 and a fastener 404. When electric current is provided to the solenoid of the electromagnetic actuator 320, the piston 402 may expand in a direction indicated by an arrow 408 shown in FIG. 4A. The fastener 404 may couple the pressure plate 318 and the cam ring 316.

As shown in FIG. 4A, when the spool lock 302 is disengaged, no current is provided to the solenoid, thus the piston 402, the pressure plate 318, and the cam ring 316 are in a first position with a distance 410 between the pressure plate 318 and the spool cap half 312. When in the first position, teeth of the cam ring 316 and the rotating lock ring 314 are not in meshing connection. Thus, for example, rotation of the cam ring 316 may not result in rotation of the rotating lock ring 314, and vice versa. The return spring 322 may be expanded, thus separating the cam ring 316 and the rotating lock ring 314 and therefore disengaging the spool lock 302. The rotating lock ring 314 and the splined intermediate shaft 216 may spin freely, thus the first output shaft 214a is not coupled to the second output shaft 214b. For example, the rotating lock ring 314 and the splined intermediate shaft 216 may rotate together when coupled, as described above with reference to the first embodiment 300 of FIG. 3A. Alternatively, the rotating lock ring 314 and the splined intermediate shaft 216 may rotate as the single unit 352, as shown in the second embodiment 350 of FIG. 3B, independent of the cam ring 316. Torque from the first electric machine 114 is output to the first wheel 102a and torque from the second electric machine 116 is output to the second wheel 102b. Nominal torque vectoring performance may be available. The configuration shown in FIG. 4A may be implemented during nominal driving conditions (e.g., when the first wheel 102a and the second wheel 102b are in contact with the driving surface), and may thus be referred to as configuration of the nominal driving mode.

The transmission 108 may include a Hall effect and/or eddy current sensor coupled to the electromagnetic actuator 320 to indicate pressure plate 318 and therefore cam ring 316 position. These or other suitable sensors (which may be used to sense two or more position states) may detect a state of engagement of the spool lock 302. For example, the sensor may detect if the spool lock 302 is disengaged or unknown; engaged or unknown; engaged, in transition, or disengaged; and/or monitor a true position of the spool lock 302.

FIG. 4B shows the spool lock 302 in an engaged configuration. The engaged configuration may be implemented when at least one of the first wheel 102a and/or the second wheel 102b is not in contact with the driving surface (e.g., in the air) or is slipping. Sensing of wheel position is further described with reference to FIG. 5. In the engaged (e.g., locked) configuration, the dog clutch comprised of the rotating lock ring 314 and the cam ring 316 may be engaged by axial displacement of an electromagnet. For example, electric current may be supplied to the solenoid of the electromagnetic actuator 320, which expands the piston 402 in the direction indicated by the arrow 408 of FIG. 4A. Expansion of the piston 402 displaces the pressure plate 318 and the cam ring 316 coupled thereto (e.g., by the fastener 404). Teeth of the cam ring 316 may mesh (e.g., engage) with teeth of the rotating lock ring 314 such that there is no or a negligible gap between the cam ring 316 and the rotating lock ring 314. The return spring 322 may be compressed along the rotational axis 220 (not shown in FIGS. 4A-4B, parallel with the x-axis in reference to reference axes 201).

When the rotating lock ring 314 is engaged with the cam ring 316, the second output shaft 214b may be coupled to the first output shaft 214a via the splined intermediate shaft 216 (e.g., via coupling of the rotating lock ring 314 and the splined intermediate shaft 216 shown in the first embodiment 300 of FIG. 3A, or via the single unit 352 in the second embodiment 350 of FIG. 3B). The second output shaft 214b may be mechanically linked to the first output shaft 214a, meaning that the second output shaft 214b and the first output shaft 214a may not rotate separately. Instead, torque of the first electric motor 114 and torque of the second electric motor 116 may be combined to increase a maximum torque output at one of the first wheel 102a and the second wheel 102*b*. In other words, one wheel may output the torque of both electric motors.

Briefly returning to FIGS. 3A-3B, the cam ring 316 may be coupled to the housing of the spool lock 302 such that the cam ring 316 rotates with rotation of the housing of the spool lock 302. As the spool lock is integrated with the second gear 204*b*, rotation of the cam ring 316 may further be coupled to rotation of the second output shaft 214*b*. The rotating lock ring 314 may be positioned in an interior of the spool lock 302 and be coupled to the splined intermediate shaft 216 as described above. For example, the rotating lock ring 314 and the splined intermediate shaft 216 may be fabricated as individual parts which are coupled via bolts, fasteners, or other sufficient coupling method in the first embodiment 300. Alternatively, the rotating lock ring 314 and the splined intermediate shaft 216 may be fabricated as a single continuous unit, as described with respect to the second embodiment 350. In both the first embodiment 300 and the second embodiment 350, the rotating lock ring 314 may rotate with rotation of the splined intermediate shaft 216 and independently of the housing of the spool lock 302 (and thus, the second output shaft 214*b*). The splined intermediate shaft 216 may be fixedly coupled to the first gear 204*a*, and thus the first output shaft 214*a*, such that the splined intermediate shaft 216 rotates with rotation of the first output shaft 214*a* and independent of rotation of the second output shaft 214*b*. Thus, when the spool lock 302 is engaged as shown in FIG. 4B, the second output shaft 214*b* may be coupled to the first output shaft 214*a* via the splined intermediate shaft 216. Torque output by the second output shaft 214*b* (e.g., the second torque) and torque output by the first output shaft 214*a* (e.g., the first torque) may be summed and output to at least one of the first wheel 102*a* and the second wheel 102*b*. Torque output is further described in reference to FIG. 5.

FIG. 5 shows a method 500 for engaging the spool lock of FIGS. 2-4B. Instructions for carrying out method 500 may be executed by a controller, such as controller 126 of FIG. 1, based on instructions stored on a memory of the controller and in conjunction with signals received from sensors of a vehicle, such as the sensors described above with reference to FIG. 1. Method 500 is described with reference to FIGS. 2-4B to illustrate motions and relative positioning during operation of the spool lock.

At 502, method 500 includes measuring and/or determining driving conditions. For example, the vehicle may be in nominal driving conditions where at least the first wheel and the second wheel are in contact with the driving surface. The vehicle may alternatively be off-road driving or performance driving, where one of the first wheel and the second wheel is not in contact with the driving surface or is slipping. The vehicle may also be operated under driving conditions other than nominal driving conditions and off-road wheel driving conditions, such as a high performance (max traction) conditions. Additionally or alternatively, a traction of each of the wheels may be sensed via a sensor or a plurality of sensors.

Off-road driving conditions may be detected using sensors 128 of FIG. 1. For example, sensors may automatically detect when at least one of the first wheel and the second wheel are off-road (e.g., not in contact with the driving surface) based on at least one of a respective estimate of traction between the wheel and the driving surface, comparison of motor torque and motor speed, comparison of speed of the first wheel and speed of the second wheel, vehicle speed and wheel speed, and so on. When traction between the wheel and the driving surface is measured, the off-road driving conditions may be detected when traction of a wheel of the first wheel and the second wheel is equal to zero or less than a determined value, indicating the wheel may not be in contact with the driving surface, is slipping, or is worn out beyond a threshold tread. The determined value may be based on a selected gear of the drivetrain and an expected traction of the tire. If the wheel traction is less than the determined value, then the wheel may not be administering all of a force applied to the wheel, resulting in wheel slip. Additionally or alternatively, the wheel may be off the ground due to road conditions, resulting in traction being less than the determined value.

If, at 504, it is determined that the vehicle is not operating under off-road wheel driving conditions or high-performance driving conditions, then at 506, the method 500 includes implementing (and/or maintaining) the nominal operating mode. Nominal operating mode may include unlocking (or maintaining disengaged/unlocked) the spool lock, thus decoupling the first output shaft and the second output shaft so that torque from the first electric motor is output to only the first wheel and torque from the second output shaft is output to only the second wheel. Torque received by the wheels may be equal to or less than corresponding threshold motor torque outputs. If the spool lock is disengaged (e.g., unlocked), electric current to the electromagnetic actuator may be stopped (or polarity reversed for bi-stable system) to release the piston and thus the pressure plate, and the return spring may expand to separate the cam ring and the rotating lock ring.

If, at 504, it is determined that the vehicle is operating in off-road wheel driving conditions of high-performance driving conditions, the method 500 includes implementing the off-road wheel driving mode. At 508, method 500 includes adjusting torque of a first motor. For example, the first motor may be the motor coupled to the wheel which is not in contact with the driving surface or is slipping. Torque of the first motor may be decreased to zero, increased to match torque of a second motor (coupled to the wheel which is in contact with the driving surface), or otherwise adjusted.

At 510, method 500 includes coupling a first output (e.g., which couples the first motor to the first wheel) to a second output (e.g., which couples the second motor to the second wheel). Coupling the first output and the second output may include engaging the spool lock at 512. This may include providing electric current to the solenoid of the electromagnetic actuator to extend a piston which engages a dog clutch, thus coupling the first shaft to the second shaft, as described in FIGS. 3-4B. In this way, the spool lock is locked.

Following engagement of the spool lock torque of the first motor and the second motor may be adjusted at 514. For example, torque of both the first motor and the second motor may be adjusted to be equivalent, and may be increased to their respective maximum available torque outputs to provide the wheel which is in contact with the driving surface with greater torque than may be provided by the single motor coupled to the wheel (e.g., greater than the corresponding threshold motor torque output). In some examples, the method may further include detecting a duration at which the wheel is operated at the torque greater than the threshold motor torque. Tire tread may wear more quickly due to the increased torque. Thus, it may be desired to monitor the duration to determine if the tire is worn passed a threshold tread and/or if a tire rotation is desired.

In some examples, additionally or alternatively, the torque adjustment of the motors may be based on one or more of driver demand, traction, vehicle maneuvers, and the like. For example, if the first wheel is slipping, then torque provided to the second wheel may be equal to or greater than a threshold second motor torque output. In some examples, additionally or alternatively, if the vehicle is turning, then torque output to the wheels may be adjusted. In one embodiment, the first wheel is a left wheel and the second wheel is a right wheel. If the vehicle is turning left and the first wheel is slipping, then torque output to the second wheel may be higher than if the vehicle is turning right and the first wheel is slipping. Additionally or alternatively, the torque output to the non-slipping or on-the-ground wheel may be uniform when slipping or a wheel in the air is detected.

Turning now to FIG. 6, it shows an operating sequence 600 graphically illustrating changes to gear train control in response to wheel torque. Plot 610 illustrates a spool position. Plot 620 illustrates a first wheel torque and dashed line 622 illustrates a threshold torque provided by only a first electric motor. Plot 630 illustrates a second wheel torque and dashed line 632 illustrates a threshold torque provided by only a second electric motor. Plot 640 illustrates a wheel position. Time increases from a left to a right side of the figure.

Prior to t1, both wheels are on the ground and/or not slipping. As such, the spool is unlocked. The first wheel torque is substantially equal to the threshold first electric motor torque and the second wheel torque is substantially equal to the threshold second electric motor torque. At t1, at least one of the wheels is off the ground and in the air. The spool is moved to a locked position by providing electricity to actuator which displaces the pressure plate and the cam ring. This engages the dog teeth between the cam ring and the rotating clutch. The cam ring transfer torque to the spool cap half, which locks the spools of the first and second gear trains together. As such, torque from the first and second electric motors may be combined.

Between t1 and t2, the second wheel torque is greater than the threshold second motor torque as the second wheel receives torque from both electric motors. The first wheel torque drops to a relatively low value (e.g., zero) due to the first wheel being in the air. Additionally or alternatively, in some embodiments, the first wheel may be slipping when the spool is locked. At t2, the first wheel contacts the ground and the spool is unlocked. After t2, each of the first wheel and the second wheel may only receive torque from corresponding electric motors.

In this way, torque of the first motor (e.g., the first electric machine) and the second motor (e.g., the second electric machine) may be summed to increase traction, maneuverability, and mobility of the wheel in contact with the driving surface when the other wheel (e.g., of the first wheel and the second wheel coupled to the first motor and the second motor, respectively) is not in contact with the driving surface. This may assist the vehicle in reestablishing contact with the driving surface for both the first wheel and the second wheel.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The disclosure also provides support for a system for an electric vehicle gearbox, comprising a first motor coupled to a first gear train, a second motor coupled to a second gear train, and a spool lock configured to couple the first gear train and the second gear train. In a first example of the system, the first gear train couples the first motor to a first wheel via a first output shaft of the first gear train and the second gear train couples the second motor to a second wheel via a second output shaft of the second gear train. In a second example of the system, optionally including the first example, a splined intermediate shaft is positioned between and in a same plane as the first output shaft and the second output shaft, and wherein the splined intermediate shaft is coupled to the first output shaft. In a third example of the system, optionally including one or both of the first and second examples, the spool lock is configured with a dog clutch and an electromagnetic actuator. In a fourth example of the system, optionally including one or more or each of the first through third examples, the dog clutch includes a cam ring coupled to the second output shaft and a rotating lock ring coupled to the splined intermediate shaft. In a fifth example of the system, optionally including one or more or each of the first through fourth examples, teeth of the cam ring are in meshing engagement with teeth of the rotating lock ring when the spool lock is engaged. In a sixth example of the system, optionally including one or more or each of the first through fifth examples, the system further comprises: a Hall Effect and/or an Eddy Current Sensor coupled to the electromagnetic actuator to indicate a position of the cam ring and thus detect a state of engagement of the spool lock.

The disclosure also provides support for a method for an electric vehicle gearbox, comprising detecting a reduced wheel traction driving condition, adjusting a first torque output of a first motor, increasing coupling of a first gear train to a second gear train using a spool lock, and adjusting the first torque output of the first motor and a second torque output of a second motor. In a first example of the method, the reduced wheel traction driving condition includes at least one driving wheel having less than nominal traction at a wheel-driving surface interface. In a second example of the method, optionally including the first example, the reduced wheel traction driving condition includes at least one driving wheel which is not in contact with the driving surface and thus having traction at the wheel-driving surface interface equal to zero. In a third example of the method, optionally including one or both of the first and second examples, the first torque output is output to a first wheel and the second torque output is output to a second wheel when the reduced wheel traction driving condition is not detected for either of the first wheel or the second wheel. In a fourth example of the method, optionally including one or more or each of the first through third examples, adjusting the first torque output includes reducing the first torque output to zero. In a fifth example of the method, optionally including one or more or each of the first through fourth examples, increasing coupling of the first gear train to the second gear train using the spool lock includes engaging a dog clutch such that a cam ring of the dog clutch and a rotating lock ring of the dog clutch are coupled and rotate as a single unit, where the cam ring is coupled to a second output shaft of the second gear train and the rotating lock ring is coupled to a first output shaft of the first gear train. In a sixth example of the method, optionally including one or more or each of the first through fifth examples, an electric current is provided to an electromagnetic actuator of the spool lock and a piston of the electromagnetic actuator pushes a pressure plate coupled to the cam ring into meshing engagement with the rotating lock ring. In a seventh example of the method, optionally including one or more or each of the first through sixth examples, increasing coupling of the first gear train to the second gear train using the spool lock allows the first torque output and the second torque output to be combined and output to the first wheel, coupled to the first output shaft, or the second wheel coupled, to the second output shaft. In an eighth example of the method, optionally including one or more or each of the first through seventh examples, increasing coupling of the first gear train and the second gear train includes complete coupling and decreasing coupling of the first gear train and the second gear train includes complete uncoupling. In a ninth example of the method, optionally including one or more or each of the first through eighth examples, the first torque output and the second torque output are output to the first wheel when the first wheel is in contact with the driving surface and the second wheel is not in contact with the driving surface or is slipping, as detected by the second wheel having less than nominal traction at the wheel-driving surface interface. In a tenth example of the method, optionally including one or more or each of the first through ninth examples, the first torque output and the second torque output are output to the second wheel when the second wheel is in contact with the driving surface and the first wheel is not in contact with the driving surface or is slipping, as detected by the first wheel having less than nominal traction at the wheel-driving surface interface. In an eleventh example of the method, optionally including one or more or each of the first through tenth examples, the spool lock is disengaged by halting the electric current (or reversing polarity in a bi-stable system) to the electromagnetic actuator and a return spring expands along an axis of rotation to separate teeth of the cam ring and teeth of the rotating lock ring. In a twelfth example of the method, optionally including one or more or each of the first through eleventh examples, adjusting the first torque output and the second torque output includes increasing the first torque output to equal the second torque output.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an electric vehicle, comprising:
a first electric motor coupled to a first gear train;
a second electric motor coupled to a second gear train, wherein the first gear train couples the first electric motor to a first wheel via a first output shaft of the first gear train and the second gear train couples the second electric motor to a second wheel via a second output shaft of the second gear train;
a spool lock configured to couple the first gear train and the second gear train; and
a splined intermediate shaft is positioned between and in a same plane as the first output shaft and the second output shaft, and wherein the splined intermediate shaft is coupled to the first output shaft and the second output shaft.

2. The system of claim 1, wherein the first gear train couples the first motor to a first wheel via a first output shaft of the first gear train and the second gear train couples the second motor to a second wheel via a second output shaft of the second gear train.

3. The system of claim 2, wherein a final drive comprises the spool lock and the splined intermediate shaft.

4. The system of claim 1, wherein the spool lock includes a dog clutch and an electromagnetic actuator.

5. The system of claim 4, wherein the dog clutch includes a cam ring coupled to the second output shaft and a rotating lock ring coupled to the splined intermediate shaft, and wherein the electromagnetic actuator comprises a piston and a fastener.

6. The system of claim 5, wherein teeth of the cam ring are in meshing engagement with teeth of the rotating lock ring when the spool lock is engaged.

7. The system of claim 4, further comprising a Hall Effect and/or an Eddy Current Sensor coupled to the electromagnetic actuator to indicate a position of the cam ring and thus detect a state of engagement of the spool lock.

8. A method for a vehicle, comprising:
during an operating mode with a wheel traction less than a determined value, locking a spool lock; and
providing torque to a wheel with more traction via a first output shaft of a first gear train coupled to a first electric motor and a second output shaft of a second gear train coupled to a second electric motor, wherein a splined intermediate shaft extends between the first gear and the second gear along a same rotational shaft as the first output shaft and the second output shaft.

9. The method of claim 8, wherein the operating mode includes where a wheel with less traction is slipping or off a ground on which the vehicle is driving.

10. The method of claim 8, further comprising unlocking the spool lock and providing torque to a first wheel via only the first output shaft of the first gear train coupled to the first electric motor, and providing torque to a second wheel via only the second output shaft of the second gear train coupled to the second electric motor during a different operating mode with a wheel traction equal to the determined value.

11. The method of claim 8, wherein locking the spool lock further includes engaging a dog clutch, wherein a cam ring of the dog clutch and a rotating lock ring of the dog clutch are coupled and rotate as a single unit, where the cam ring is coupled to the second output shaft of the second gear train and the rotating lock ring is coupled to a first output shaft of the first gear train.

12. The method of claim 11, wherein an electric current is provided to an electromagnetic actuator of the spool lock and a piston of the electromagnetic actuator pushes a pressure plate coupled to the cam ring into meshing engagement with the rotating lock ring.

13. The method of claim 8, further comprising combining a torque output of the first electric motor and a torque output of the second electric motor when the spool lock is locked, wherein the provided torque is equal to the combined torque output.

14. The method of claim 8, wherein providing torque to the wheel with more traction comprises where the provided torque is greater than a maximum torque output of one of the first electric motor or the second electric motor.

15. The method of claim 8, wherein the first wheel, the second wheel, the first output shaft, the second output shaft, and the intermediate shaft are arranged along the rotational axis.

16. A system for a vehicle drivetrain; comprising:
- a first electric motor coupled to a first gear train, the first gear train comprising a first output shaft coupled to a first wheel;
- a second electric motor coupled to a second gear train, the second gear train comprising a second output shaft coupled to a second wheel, wherein the second gear train is separate from the first gear train;
- an intermediate shaft arranged between and in a same plane as the first output shaft and the second output shaft, and wherein the intermediate shaft is splined and coupled to the first output shaft and the second output shaft;
- a spool lock circumferentially surrounding at least a portion of the intermediate shaft; and
- a controller with computer-readable instructions stored on memory thereof that when executed cause the controller to:
- unlock the spool lock in response to a traction of the first wheel and the second wheel being equal;
- maintain a torque output of the first electric motor and the second electric motor;
- lock the spool lock in response to the traction of the first wheel and the second wheel being unequal;
- adjust a torque output of the first electric motor and the second electric motor; and
- supply a combined torque output of the first electric motor and the second electric motor to one of the first wheel and the second wheel.

17. The system of claim 16, wherein the instructions further cause the controller to select a wheel of the first wheel and the second wheel with greater traction to supply the combined torque output.

18. The system of claim 16, wherein the instructions further cause the controller to supply a torque output of only the first electric motor to the first wheel when the spool lock is unlocked, and wherein a torque output of only the second electric motor is supplied to the second wheel when the spool lock is unlocked.

19. The system of claim 16, wherein the intermediate shaft is interlocked with the first output shaft at a first end and the second output shaft at a second end when the spool lock is locked.

20. The system of claim 16, wherein the first wheel, the first output shaft, the second wheel, the second output shaft, and the intermediate shaft are arranged on a single rotational axis.

* * * * *